Figure 1:
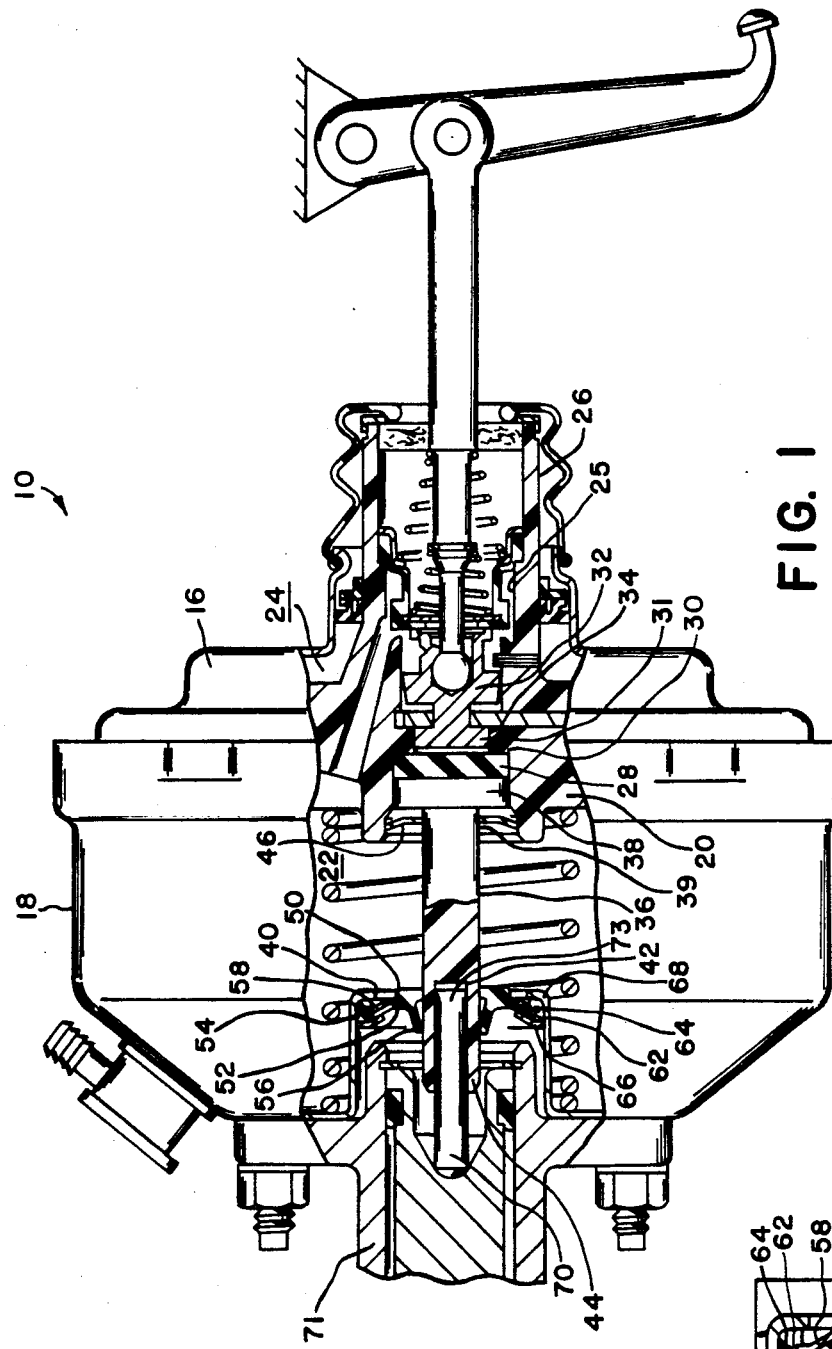

United States Patent [19]

Fulmer

[11] Patent Number: 4,660,460
[45] Date of Patent: Apr. 28, 1987

[54] MAGNETIC FRONT SEAL FOR VACUUM BRAKE BOOSTER

[75] Inventor: Keith H. Fulmer, Mishawaka, Ind.

[73] Assignee: Allied Corporation, Morristown, N.J.

[21] Appl. No.: 759,986

[22] Filed: Jul. 29, 1985

[51] Int. Cl.⁴ .............................................. F15B 9/10
[52] U.S. Cl. .................. 91/376 R; 60/547.1; 92/168; 91/DIG. 4; 277/80
[58] Field of Search ........ 91/376 R, DIG. 4; 60/547.1; 92/168; 277/80

[56] References Cited

U.S. PATENT DOCUMENTS

| 3,178,191 | 4/1965  | Dodd       | 277/138 |
| 3,306,621 | 2/1967  | Fisher     | 277/80  |
| 3,708,177 | 1/1973  | Baermann   | 277/80  |
| 3,724,211 | 4/1973  | Julow      | 60/533  |
| 4,117,769 | 10/1978 | Carré      | 92/48   |
| 4,171,818 | 10/1979 | Moskowitz  | 277/80  |
| 4,211,151 | 7/1980  | Wallischeck| 92/168  |
| 4,466,246 | 8/1984  | Furuta     | 60/547.1|
| 4,493,742 | 1/1985  | Putt       | 92/168  |
| 4,526,089 | 7/1985  | Takeuchi   | 92/168  |
| 4,608,825 | 9/1986  | Fontaine   | 60/547.1|

FOREIGN PATENT DOCUMENTS

| 93859   | 11/1983 | European Pat. Off. | 91/DIG. 4 |
| 1020674 | 5/1983  | U.S.S.R.           | 277/80    |

Primary Examiner—Abraham Hershkovitz
Attorney, Agent, or Firm—Leo H. McCormick, Jr.; Ken C. Decker

[57] ABSTRACT

A retention arrangement for holding an output push rod (70) in a vacuum brake booster (10). The output push rod (70) has a plastic plunger section (36) and a metal insert (70). The plastic section (36) is held in a movable wall of the brake booster by a clip member (46) while the metal insert (70) is held in the plastic plunger (36) by a magnetized rubber seal (50).

4 Claims, 2 Drawing Figures

MAGNETIC FRONT SEAL FOR VACUUM BRAKE BOOSTER

This invention relates to a retention arrangement for holding a push rod in a vacuum brake booster.

Heretofore, the output push rod of a vacuum brake booster was located in the movable wall and provided with a threaded end that received a screw head member. Before being joined to a master cylinder, the head member was adjusted to provide a master cylinder with an input such that the stroke of the movable wall matched the piston stroke in the maste cylinder, such a combination is disclosed in U.S. Pat. No. 3,724,211 (Julow) which issued Apr. 3, 1973.

If the vacuum brake booster and master cylinder were not manufactured by the same company, in shipping, the push rod could be displaced and even lost. To prevent this problem, it was suggested that a plastic cap placed on the end during shipping would assure that the push rod was not lost in transit. Since this required another part, costs were correspondingly increased.

Similarly as disclosed in U.S. Pat. No. 4,117,769 (Carré) issued Oct. 3, 1978, a clip member was added to the movable wall to retain the push rod with the vacuum brake booster for shipping between the place of manufacture and assembly with a master cylinder.

In an effort to reduce the weight of a vacuum brake booster and yet retain the structural integrity needed to provide the output force required to operate a master cylinder, it was suggested that the metal output push rod be replaced by a plastic material. When the entire push rod was made of plastic and during maximum actuation, because of the size restriction for the connection with the master cylinder, stressing of the plastic could cause a failure. When the plastic push rod was reinforced with a metal insert, the metal insert was often times lost during transit.

The present invention covers a retention arrangement for holding a metal insert in a plastic plunger of a vacuum brake booster.

The front seal of the type disclosed in U.S. Pat. No. 3,178,191 (Dodd) issued Apr. 13, 1965 was replaced with a flexible seal make of a nitrile rubber binder containing oriented barium ferrite magnet material of the type sold by 3M Company under the trade name of Plastiform ®. The lip on the seal engages the plastic plunger and in the rest position holds the metal push rod insert in alignment with a piston in the master cylinder. Once the proper metal insert is selected and inserted into the bore in the plunger, a force of approximately 25 lbs. is required to remove the metal insert. It is anticipated that a vacuum brake booster will not experience this type of force in shipping.

An advantage of this invention occurs since the total amount of parts that make up a vacuum brake booster remain the same and yet a lighter weight vacuum brake booster can be manufactured through the use of plastic components.

It is an object of this invention to provide vacuum brake booster with a retention system for magnetically holding a metal insert in a plastic plunger.

Figure 2:
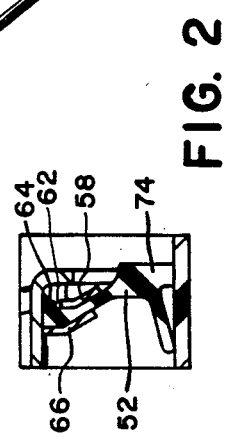

These and other advantages and objects should be apparent from reading this specification while viewing the drawings wherein:

FIG. 1 is a schematic illustration of a vacuum brake booster made according to the principles of this invention; and FIG. 2 is an enlarged sectional illustration of a magnetic retention seal for the vacuum brake booster of FIG. 1.

The vacuum brake booster 10 shown in FIG. 1 includes a rear shell 16 which is joined to a front shell 18 by a typical twist lock connection. The front and rear shell support a flexible diaphragm which in conjunction with hub 20 separate the interior into a front chamber 22 and a rear chamber 24.

The hub 20 has a bore 25 therein with a control valve located in a rear projection 26 that extends through the rear shell 16.

A reaction disc 28 is located in bore 25 adjacent a shoulder 30. A face 31 on plunger 32 that extends from the control valve is positioned on a bearing surface 34 adjacent the reaction disc 28.

A plastic push rod or plunger 36 has a first end or head 38 that is located in bore 24 and engages the reaction disc 28 and a second end 44 that extends through opening 40 in the front shell 18. Plunger 36 has a bore 42 that extends to a point between the second end 44 and head 38. The depth of bore 42 is such that the bottom thereof is approximately in alignment with a plane parallel to opening 40. A clip retainer 46 surrounds stem 39 of the plunger 36 and engages bore 24 to hold head 38 in hub 20.

A seal 50 has a cylindrical disc member 52 with a bead 54 on its peripheral surface and a lip 56 on its inner surface. A reinforcing washer 58 extends into bead 54 and is attached to the disc member 52 by a plurality of projections 62 which extend into openings 64 in the washer 58. The lip 56 resiliently engages stem 39 to seal chamber 22 from the surrounding environment.

A clip 66 engages disc member 52 to hold bead 54 against flange 68 of opening 40 on the front shell 18.

A metal insert push rod 70 is located in bore 42. The length of push rod 70 is selected to match the actuation stroke of the master cylinder 71 and vacuum brake booster 10.

In order to hold the metal push rod 70 in bore 42, the seal 50 is made of a nitrile rubber containing barrium ferrite magnetic particles. This type material is sold by 3M Corporation under the trade name of Plastiform ®. The lip 56, with the wall or diaphragm in the rest position, acts on the end 73 of the metal push rod 70 to hold the push rod 70 within bore 42.

Under some circumstances because of the length or mass of push rod 70, as shown in FIG. 2, it may be necessary to add additional magnetic material 74 to disc member 52. The magnetic material has a maximum magnetic force of $1.4 \times 10^6$ Gauss-Oersteds. From the length and diameter of the metal push rod 70 its mass can be calculated and thereafter the amount of holding power needed to retain the push rod 70 within bore 42 can be obtained.

Since the magnetic material is flexible, the lip 56 engages surface or stem 39 to form a seal when vacuum is located in chamber 22.

I claim:

1. In a brake booster having a front shell joined to a rear shell to define a sealed cavity, a wall dividing the cavity into a front chamber and a rear chamber, a control valve connected to the wall, an output member connected to said wall and extending through an opening in said front shell, and an input member extending through the rear chamber, said input member responding to an actuation signal by operating said valve to allow air to enter said rear chamber and create a pressure differential across said wall with vacuum present in said front chamber, said pressure differential acting on and moving said wall to produce an output force that is transmitted through said output member, the improvement comprising:

- a seal surrounding said opening in said front shell, said seal having a flexible lip that surrounds an opening therein, said lip being made of a magnetic material;
- a plunger having a head on a first end connected to said wall and a second end, said plunger being made of a non-metallic material, said plunger having a bore that extends from said second end to a position between said first and second ends, said second end extending through an opening in said seal, said flexible lip engaging said non-metallic plunger to seal said front chamber from said surrounding environment; and
- a metal push rod located in said bore of said plunger for transmitting said output force from said plunger into another member on movement of said wall, said magnetic material in said flexible lip retaining said metal push rod in said non-metallic plunger in the absence of said another member being connected to said metal push rod.

2. In the brake booster as recited in claim 1 wherein said output member includes:

- a retainer that holds said plunger in an opening in said wall.

3. In the brake booster, as recited in claim 2 wherein said seal includes:

- a disc that surrounds said plunger and made of said magnetic material, said disc enhancing the magnetic retention of said push rod in said plunger.

4. In the brake booster as recited in claim 3 wherein said plunger is made of a plastic material to aid in the reduction of the weight of said brake booster while providing a smooth surface for engagement with said lip to assure that a seal between said front chamber and the surrounding environment is produced.

* * * * *